(12) United States Patent
Wang et al.

(10) Patent No.: US 11,949,688 B2
(45) Date of Patent: Apr. 2, 2024

(54) SECURING BROWSER COOKIES

(71) Applicant: Google LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 17/426,743

(22) PCT Filed: Aug. 13, 2020

(86) PCT No.: PCT/US2020/046101
§ 371 (c)(1),
(2) Date: Jul. 29, 2021

(87) PCT Pub. No.: WO2021/030545
PCT Pub. Date: Feb. 18, 2021

(65) Prior Publication Data
US 2022/0166780 A1    May 26, 2022

Related U.S. Application Data

(60) Provisional application No. 62/886,195, filed on Aug. 13, 2019.

(51) Int. Cl.
H04L 29/00 (2006.01)
H04L 9/32 (2006.01)
H04L 9/40 (2022.01)

(52) U.S. Cl.
CPC .......... H04L 63/123 (2013.01); H04L 9/3247 (2013.01)

(58) Field of Classification Search
CPC ... H04L 63/123; H04L 9/3247; H04L 9/3213; H04L 63/083; H04L 2209/60; H04L 63/0807; G06F 21/6263
See application file for complete search history.

(56) References Cited

U.S. PATENT DOCUMENTS

| | | | |
|---|---|---|---|
| 7,478,434 B1 * | 1/2009 | Hinton | G06F 16/958 726/28 |
| 2006/0101114 A1 | 5/2006 | Sandhu et al. | |

(Continued)

FOREIGN PATENT DOCUMENTS

| | | |
|---|---|---|
| CN | 108965230 | 12/2018 |
| JP | 2006-120148 | 5/2006 |

(Continued)

OTHER PUBLICATIONS

International Preliminary Report on Patentability in International Appln. No. PCT/US2020/046101, dated Feb. 24, 2022, 11 pages.

(Continued)

Primary Examiner — Ghazal B Shehni
(74) Attorney, Agent, or Firm — Fish & Richardson P.C.

(57) ABSTRACT

Methods, systems, and apparatus, including an apparatus for verifying the integrity of requests. In some aspects, a method includes receiving, from an application, a request including an attestation token of the application. The attestation token includes a set of data that includes at least a public key of the application and a token creation time that indicates a time at which the attestation token was created. The attestation also includes a signature of the set of data. The signature is generated using a private key that corresponds to the public key. The integrity of the request is verified using the attestation token. The verification includes determining that the integrity of the request is valid based on a determination that the token creation time is within a threshold duration of the time at which the request was received and a determination that the set of data has not been.

22 Claims, 6 Drawing Sheets

(56) References Cited

U.S. PATENT DOCUMENTS

| | | | | |
|---|---|---|---|---|
| 2011/0099379 A1* | 4/2011 | Ganesan | ............... | H04L 9/3226 713/175 |
| 2011/0197068 A1* | 8/2011 | Holden | ............... | H04W 12/069 713/175 |
| 2012/0265984 A1* | 10/2012 | Ramanujan | ............. | H04L 63/12 713/176 |
| 2019/0124070 A1 | 4/2019 | Engan et al. | | |
| 2020/0052903 A1* | 2/2020 | Lam | ...................... | H04L 9/3239 |

FOREIGN PATENT DOCUMENTS

| | | |
|---|---|---|
| JP | 2007-527059 | 9/2007 |
| WO | WO 2015/122009 | 8/2015 |

OTHER PUBLICATIONS

Office Action in Indian Appln. No. 202127032462, dated Apr. 20, 2022, 5 pages (with English translation).

Office Action in Japanese Appln. No. 2021-545903, dated Oct. 31, 2022, 8 pages (with English translation).

Anonymous, "Get started with JSON Web Tokens," May 23, 2019, retrieved on Jul. 31, 2020, retrieved from URL <https://web.archive.org/web/20190523072227/https://ath0.com/learn/json-web-tokens/>, 9 pages.

Anonymous, "JSON Web Token (JWT)," Aug. 7, 2019, retrieved on Jul. 31, 2020, retrieved from URL <https://web.archive.org/web/20190807042738/https://www.iana.org/assignments/jwt.xtml>, 6 pages.

International Search Report and Written Opinion in International Appln. No. PCT/US2020/046101, dated Sep. 28, 2020, 13 pages.

Office Action in Korean Appln. No. 10-2021-7024826, dated Mar. 30, 2023, 13 pages (with English translation).

Notice of Allowance in Japanese Appln. No. 2021-545903, dated Jun. 26, 2023, 5 pages (with English translation).

Office Action in Korean Appln. No. 10-2021-7024826, dated Oct. 24, 2023, 11 pages (with English translation).

\* cited by examiner

SECURING BROWSER COOKIES

CROSS-REFERENCE TO RELATED APPLICATIONS

This application is a National Stage Application under 35 U.S.C. § 371 and claims the benefit of International Applicaton No. PCT/US2020/046101, filed Aug. 13, 2020, which claims the benefit of U.S. Application No. 62/886,195, filed Aug. 13, 2019. The disclosure of the foregoing applications are hereby incorporated by reference in their entirety.

BACKGROUND

A browser cookie is a small amount of data stored on a user device by a web browser. Browser cookies can be used for many purposes, including storing stateful information, recording browsing activity, and authenticating users. There are several types of cookies, including first-party cookies and third-party cookies. A first-party cookie is a cookie that is created by a domain that a user views directly, i.e., the domain viewable in the address bar of the browser. In contrast, a third-party cookie is a cookie that is created and/or accessed by a different domain than the one viewable in the address bar.

SUMMARY

This specification describes technologies relating to authentication and security of browser cookies.

In general, one innovative aspect of the subject matter described in this specification can be embodied in methods that include receiving, from an application of a client device, a request including an attestation token of the application, the attestation token including: a set of data that includes at least a public key of the application and a token creation time that indicates a time at which the attestation token was created; and a signature of the set of data, wherein the signature was generated using a private key that corresponds to the public key; and verifying an integrity of the request using the attestation token, including: determining whether the token creation time is within a threshold duration of a time at which the request was received; determining, using the public key and the signature of the set of data generated using the private key, whether the set of data was modified after the attestation token was created; and determining that the integrity of the request is valid based at least on determination that the token creation time is within the threshold duration of the time at which the request was received and a determination that the set of data has not been modified since the attestation token was created; and responding to the request in response to determining that the integrity of the request is valid. Other implementations of this aspect include corresponding apparatus, systems, and computer programs, configured to perform the aspects of the methods, encoded on computer storage devices.

These and other implementations can each optionally include one or more of the following features. In some aspects, the application is a web browser.

In some aspects, the set of data includes a browser integrity token that specifies whether integrity of the web browser is valid. Determining that the integrity of the request is valid can include determining that the browser integrity token specifies that the integrity of the web browser is valid.

In some aspects, the request is for content for delivery to application. Aspects can include providing the content in response to determining that the request is valid. The set of data can include a payload that includes data specific to the request. The request can be a request to delete user data and the payload can include data specifying an operation to delete the user data.

In some aspects, the attestation token includes a group of encrypted cookie elements that includes, for each of multiple recipients of the request, a respective encrypted cookie element that includes an encrypted result from encrypting a cookie of the recipient that is stored on the client device using a public key of the recipient. The encrypted result of the respective encrypted cookie element for each recipient includes an encrypted result from encrypting a combination of the cookie of the recipient and the signature of the set of data. Determining that the integrity of the request is valid can include decrypting, by a given recipient and using a private key of the given recipient, a given encrypted cookie element to generate a decrypted cookie element, determining that the decrypted cookie element comprises a first portion that matches the signature of the set of data, and determining that the decrypted cookie element comprises a second portion that matches a cookie identifier of the given recipient.

In some aspects, the encrypted result of the respective encrypted cookie element for each recipient can include an encrypted result from encrypting the cookie of the recipient using the signature of the set of data as an encryption initialization vector. Determining that the integrity of the request is valid can include decrypting, by a given recipient and using a private key of the given recipient and the signature of the set of data as the encryption initialization vector, a given encrypted cookie element to generate a decrypted cookie element and determining that the decrypted cookie element matches a cookie identifier of the given recipient. Some aspects can include ignoring the request whenever a determination is made that the integrity of the request not valid.

In general, another innovative aspect of the subject matter described in this specification can be embodied in methods that include generating, at a web browser of a client device, an attestation token having a set of data that includes at least (i) a public key of the web browser, (ii) a token creation time that indicates a time at which the attestation token was created, and (iii) a signature of the set of data, wherein the signature is generated using a private key that corresponds to the public key; and transmitting a request to a recipient, the request including the attestation token. Other implementations of this aspect include corresponding apparatus, systems, and computer programs, configured to perform the aspects of the methods, encoded on computer storage devices.

These and other implementations can each optionally include one or more of the following features. In some aspects, the set of data includes a browser integrity token that specifies whether integrity of the web browser is valid. The set of data can include a payload that includes data specific to the request.

In some aspects, the set of data includes a payload that includes data specific to the request, the request comprises a request to delete user data and the payload comprises data specifying an operation to delete the user data. The attestation token can include a group of encrypted cookie elements that includes, for each of multiple recipients of the request, a respective encrypted cookie element that includes an encrypted result from encrypting a cookie of the recipient that is stored on the client device using a public key of the recipient. The encrypted result of the respective encrypted cookie element for each recipient can include an encrypted result from encrypting a combination of the cookie of the recipient and the signature of the set of data. The encrypted result of the respective encrypted cookie element for each recipient can include an encrypted result from encrypting the cookie of the recipient using the signature of the set of data as an encryption initialization vector.

The subject matter described in this specification can be implemented in particular embodiments so as to realize one or more of the following advantages. Attestation tokens included with requests emitted by browsers (or other applications) can be used to generate secure communication channels between a web browser and other entities that receive the requests. This secure channel enables users to manage their data that is being stored by other parties without risk of others fraudulently managing their data. By transmitting, together with the attestation token, a digital signature of data included in the attestation token, a recipient of the request can determine whether any of the data in the attestation token was modified after creation. In addition, the inclusion of a token creation time in the attestation token enables recipients to determine whether requests are new or potentially part of a replay attack.

The attestation tokens can include a group of encrypted cookie elements that includes, for each of multiple recipients, an encrypted cookie of the recipient which can be decrypted by that recipient. This allows the same attestation token to be sent to multiple recipients, while preventing the recipients from accessing the cookies of other recipients, thereby protecting the security of data in the cookie. Further, by encrypting the cookies using a signature generated based on other data included in the attestation token, the encrypted cookie elements are request-specific and cannot be used to track a user by any domain except the one that owns the cookie.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, systems and techniques described herein can provide a secure communication channel between users' web browsers and other entities, such as content publishers, digital component distribution systems, and digital component providers that create and provide digital components for distribution by the digital component distribution system. The web browser can provide, with requests, an attestation token that is used by the other entities to validate the integrity of the requests. The requests can include, for example, requests to manage data of the users (e.g., to delete user-related data) and/or requests for digital components to present with other content. Securing the communication channel using the attestation token ensures that fraudulent parties cannot change, delete, or otherwise access user data, or change the content of the requests, e.g., to deceive digital component distribution systems and/or providers as to, for example, the nature and/or source of the requests.

Figure 1:
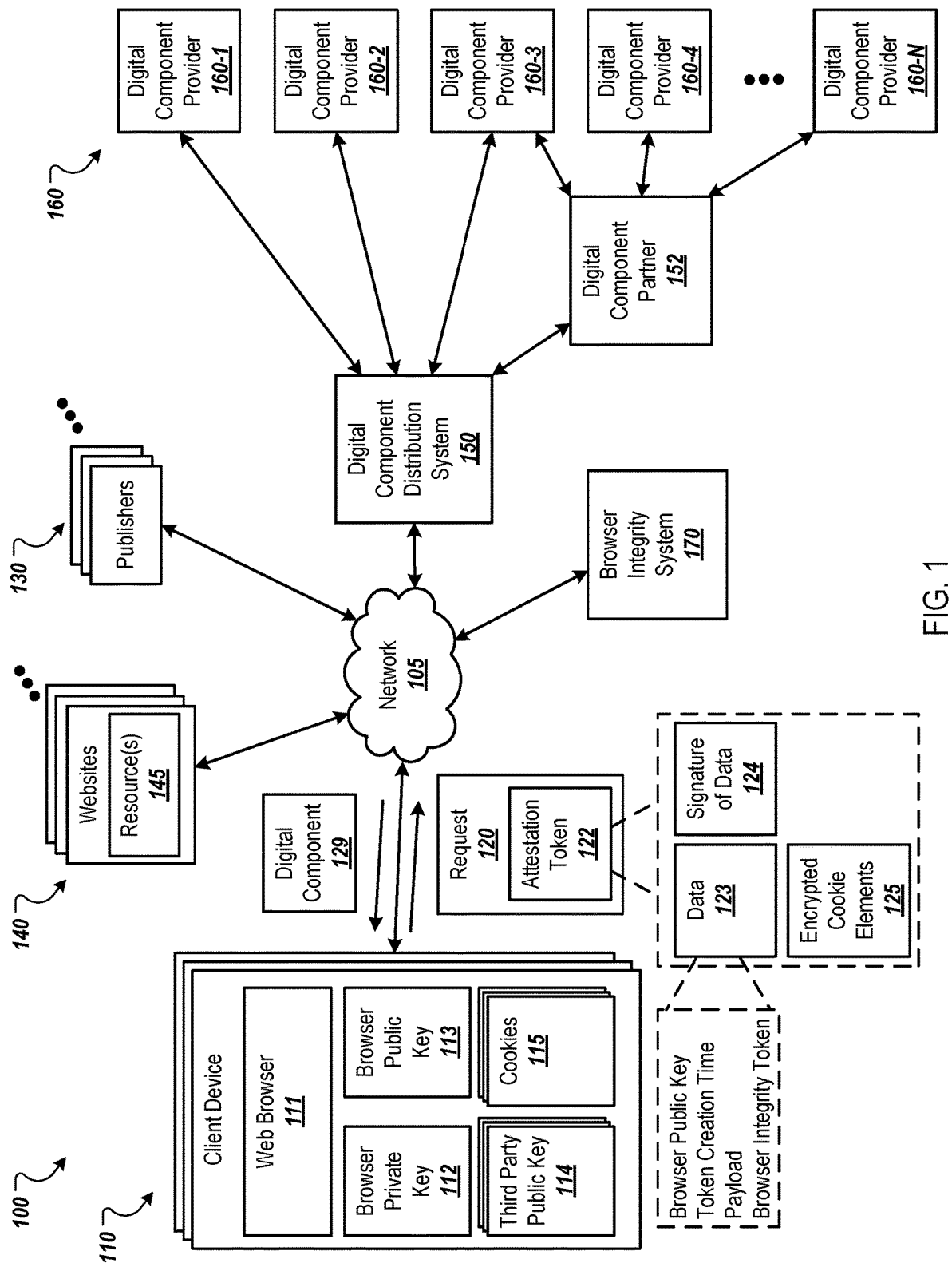
FIG. 1 is a block diagram of an environment in which a digital component system distributes digital components.

FIG. 1 is a block diagram of an environment 100 in which a digital component system 150 distributes digital components 129. The example environment 100 includes a data communication network 105, such as a local area network (LAN), a wide area network (WAN), the Internet, a mobile network, or a combination thereof. The network 105 connects client devices 110, publishers 130, websites 140, the digital component distribution system 150, and a browser integrity system 170. The example environment 100 may include many different client devices 110, publishers 130, and websites 140.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105. A client device 110 typically includes applications, such as a web browser 111 and/or native applications to facilitate the sending and receiving of data over the network 105. A native application is an application developed for a particular platform or a particular device. Publishers 130 can develop and provide the native applications to the client devices 110. Description below of operations and functions performed by the web browser 111 may be performed by a native application.

The web browser 111 can request a resource 145 from a web server that hosts a website 140 of a publisher 130, e.g., in response to the user of the client device 110 entering the resource address for the resource 145 in an address bar of the web browser 111 or selecting a link that references the resource address. When the web server provides a resource 145 to the web browser 111, the web server can also provide a cookie 115 of the publisher 130 that the web browser 111 stores on the client device 110. The cookie 115 is a small amount of data, e.g., a text file, that can be used for many purposes, including storing stateful information, recording browsing activity, and authenticating users. The cookies 115 can include a unique cookie identifier and the small amount of data (which can include a cookie value, attributes, etc.).

This cookie is referred to as a first-party cookie as the cookie is created by a website that a user views directly, i.e., the website for which the domain is viewable in the address bar of the web browser 111.

The web browser 111 can send the publisher's first-party cookie to the web server that hosts the website 140 when the web browser 111 subsequently navigates to the resource 145 and/or while the resource 145 is presented by the web browser 111. The web server can use the data in the cookie 115, for example, to customize content for the user.

In some cases, another web server that hosts another website also stores a cookie 115 on the client device 110 while the resource 145 is presented in the web browser 111, although that website's domain is not viewable in the address bar of the web browser 111 and the user did not navigate the web browser to that website. This cookie is referred to as a third-party cookie. A third-party cookie can be stored on the client device 110 when the resource 145 makes a call for content from the other web server.

Some resources 145 include digital component slots for presenting digital components with the resources 145. As used throughout this document, the phrase "digital component" refers to a discrete unit of digital content or digital information (e.g., a video clip, audio clip, multimedia clip, image, text, or another unit of content). A digital component 129 can electronically be stored in a physical memory device as a single file or in a collection of files, and digital components can take the form of video files, audio files, multimedia files, image files, or text files. For example, the digital component 129 may be content that is intended to supplement content of a web page or other resource presented by the web browser 111. More specifically, the digital component 129 may include digital content that is relevant to the resource content (e.g., the digital component may relate to the same topic as the web page content, or to a related topic). The provision of digital components by the digital component distribution system 150 can thus supplement, and generally enhance, the web page content.

When the web browser 111 loads a resource 145 that includes one or more digital component slots, the web browser 111 can request a digital component 129 for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 152. A digital component partner 152 is an entity that selects digital components on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 152, a digital component based on relatedness to the resource 145, performance of the digital component (e.g., a rate at which users interact with the digital component), etc. The digital component distribution system 150 can then provide the selected digital component(s) to the client device 110 for presentation with the resource 145.

In some cases, the digital component distribution system 150, the digital component partner 152, and/or the digital component provider 160 for which a digital component is provided can also store a third-party cookie 115 on the client device 110. The web browser 111 can also provide the third-party cookie 115 to the entity that stored the third-party cookie on the client device 110. In this way, the entity can use information stored in the third-party cookie 115 to select digital components for presentation at the client device 110.

The digital component distribution system 150 can transmit digital components 129 to one or more client devices 110 for presentation by web browsers 111 and/or other applications (e.g., native applications developed for a particular platform) operating on the client devices 110.

The web browser 111 can include tools that enable users to manage the data that is collected and stored in first party cookies and third-party cookies. The web browser 111 can also include tools that enable the users to manage the data that is stored by other entities, including the publishers 130, the digital component distribution system 150, the digital component partners 152, and the digital component providers 160. For example, the web browser 111 can include a menu that enables users to view cookies 115 that are stored on their client devices 110, select the types of data that each cookie 115 can (or cannot) store, select the data that can be stored by the other entities, etc. These tools enable the users to manage their data and therefore their privacy.

When the web browser 111 sends a request 120 over the network 105, the web browser 111 can generate and send an attestation token 122 with the request. For example, if the web browser 111 sends a digital component request to the digital component distribution system 150, this request can include an attestation token 122. Similarly, if the web browser 111 sends a request to another entity (e.g., to a publisher 130, the digital component distribution system 150, the digital component partner 152, or a digital component provider 160) to manage, e.g., delete, the data stored by that entity, this request can include an attestation token 122.

The attestation token 122 is used by these entities to validate the integrity of the request and ensure that the request has not been tampered with. For example, enabling users to manage their data that is stored by other entities can open up the possibility of malicious parties on the Internet attempting to manage and/or steal other users' data. For digital components, some malicious entities may attempt to falsify the parameters of digital component requests, e.g., to specify different resources with which the digital component will be provided and/or to specify a different user to which the digital component will be presented.

The attestation token 122 includes information and an encryption scheme that provides a secure communication channel between the web browser 111 and the other entities. This prevents others from altering the requests 120, obtaining the cookies of other entities, submitting the same request multiple times (e.g., in the form of a replay attack) and/or ensures that the request 120 came from a validated web browser.

The attestation token 122 includes a set of data 123 and a signature 124, e.g., a digital signature, of the set of data 123. The set of data 123 can include a public key of the web browser 111 sending the request (e.g., public key 123), a token creation time that indicates a time at which the attestation token 122 was created, a payload, and/or a browser integrity token.

The web browser 111 can generate and maintain one or more pairs of related cryptographic keys including a private key 112 and a public key 113 that corresponds to, and is mathematically linked to, the private key 112. In some implementations, the keys 112 and 113 are provided to the web browser 111 from another application or device. Data that is digitally signed using the private key 112 can only be verified using the corresponding public key 113. Similarly, data that is encrypted using the public key 113 can only be decrypted using the private key 112.

The web browser 111 generates a digital signature 124 of the set of data 123 using a private key 112 for use in validating the integrity of the request 120 by verifying that the set of data 123 was not changed after it was generated by the web browser 111 and for proving that the request originated at the browser 111. In some implementations, the web browser 111 uses an Elliptic Curve Digital Signature Algorithm (ECDSA) to generate the digital signature, but other signature techniques (e.g., RSA) can also be used. The corresponding public key 113 is provided with the attestation token 122 so that entities that receive the attestation token 122 can use the public key 113 to verify the signature 124 of the set of data 123. The web browser 111 can generate the digital signature by signing over the set of data 123 using the private key 112.

In some implementations, the attestation token 122 may advantageously serve as a first-party cookie, e.g., for a publisher 130 or the digital component distribution system 150, thereby reducing a number of discrete cookies that need be stored, transmitted, and managed. In such cases, the public key 113 as part of the data 123 can serve as the cookie identifier for the first-party cookie.

In some implementations, the public key 113 (and its corresponding private key 112) is an ephemeral key that has a limited life cycle. If the same public key 113 is sent from the same web browser 113 over the course of many requests and/or long periods of time, entities that receive the requests with the public key 113 can track the user of the web browser. For example, the entities can use the public key 113 as an identifier for the user and correlate the payload data of each request to that identifier. Thus, limiting the lifecycle of the public key 113 can limit this tracking ability and therefore protect users' privacy.

The lifecycle of the public key 113 can be configured based on the target level of user privacy. For the most privacy, the lifecycle can be for a single request. That is, the web browser 111 can generate a new public/private key pair for each request 120 sent by the web browser 111. The tradeoff for this level of privacy is the computation cost (e.g., processing power, resource usage, etc.) to generate the public/private key pair. In implementations in which a browser integrity token is generated for each public/private key pair as described below, the computation costs can be even higher and there can be additional latency resulting from communicating with the browser integrity system 170 over the network 105.

In some implementations, the lifecycle of the public key 113 can be for a single page view. In this example, the web browser 111 can generate a new public/private key pair each time the web browser downloads and presents a resource 145. If multiple requests are sent from the same pageview while the page is presented, each request can include an attestation token 122 that has the same public key 113 and a digital signature generated using the same public key 113. This can reduce the computation and latency costs relative to generating a new public/private key pair for each request 120.

In some implementations, the lifecycle of the public key 113 can be for a given publisher domain. In this example, the web browser 111 can generate a respective public/private key pair for each publisher 130 for which the user visits a website 140. In this example, the attestation token 122 for a given publisher can serve as the first-party cookie for the given publisher. In addition, the public key 113 can serve as the cookie identifier for the first-party cookie (e.g., attestation token 122) for the given publisher. This effectively provides a browser-managed first party read-only cookie. This example lifecycle can further reduce the computation and latency costs relative to generating a new public/private key pair for each request 120 and generating a new public/private key pair for each page view.

In some implementations, the web browser 111 can also generate a respective public/private key pair for each digital component provider 160, similar to the way in which the web browser 111 can generate a respective public/private key pair for each publisher 130 for which the user visits a website 140. This effectively provides a browser-managed third-party read-only cookie.

As described above, the token creation time indicates a time at which the attestation token 122 was created. The web browser 111 can record the creation time when the web browser 111 creates the attestation token. This token creation time can be a high resolution timestamp (e.g., accurate to the second, to the millisecond, or to the microsecond). The token creation time can be used to determine whether a request 120 that includes the attestation token 122 is new or recent request. For example, the entity that receives the attestation token 122 can compare the token creation time to a current time or a time at which the attestation token was received. If the difference between the two times exceeds a threshold, the entity can determine that the request is not new, or invalid, as described in more detail below.

The token creation time can also be used to detect replay attacks. For example, if multiple requests having the same set of data 123, including the same token creation time, are received, the entity that receives the requests can determine that the requests are duplicates and/or that the requests are part of a replay attack.

The token creation time, in combination with other data, can also serve as a transaction identifier for a request 120. For example, the transaction identifier can be a combination of two or more of the token creation time of the attestation token 122, the public key 113 of the attestation token 122, and a recipient's third-party cookie (e.g., one of the encrypted cookies 125 described below). The transaction identifier can be used to deduplicate multiple versions of the same request received from multiple channels. For example, the digital component provider 160-3 can receive the same request from both the digital component distribution system 150 and the digital component partner 152. In this example, the transaction identifier can be based on the token creation time of the attestation token 122, the public key 113 of the attestation token 122, and the decrypted third-party cookie of the digital component provider 160-3. The digital component provider 160-3 can compare the three pieces of data in two or more requests to determine whether the requests are duplicates, thereby preventing the transmission of duplicated and unnecessary responses.

The payload can include data for the individual request 120. For example, if the request 120 is for a digital component, the payload can include data that can be used to select a digital component. This payload could include the resource 145 that has the digital component slot (or a URL for the resource 145), information about the resource 145 (e.g., topic of the resource), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

If the request 120 is to manage the user's data at a publisher 130, the digital component distribution system 150, the digital component partner 152, a digital component provider 160, or another entity, the request 120 can include data specifying the requested change. For example, if the user selected to remove all of the user's data from a digital component provider 160-2, the payload would include data specifying this removal of data and the digital component provider 160-2 (e.g., an identifier or network address for the digital component provider 160-2).

The browser integrity token enhances the fraud detection capabilities of the attestation token 122 by enabling the detection of more classes of fraud, such as whether user interactions with websites 140 are genuine. The web browser 111 can include an in-browser integrity component that interacts with the browser integrity system 170, which can be implemented using one or more servers connected to the network 105. The in-browser integrity component can collect fraud detection signals to be analyzed by the browser integrity system 170. The fraud signals can include, for example, mouse movement speed, direction, intermission and other patterns, click patterns, and/or other device-level signals that can be used to determine when a browser has been compromised. If the browser integrity system 170 concludes that the integrity of the browser 111 is valid, the browser integrity system 170 can issue a browser integrity token to the web browser 111.

The browser integrity token can include a token creation time that indicates a time at which the browser integrity token was created, the public key 113 of the browser 111 that requested the browser integrity token, the verdict (e.g., whether the browser is valid), and/or a digital signature of the rest of the browser integrity token (e.g., the token creation time, the public key 113, and/or the verdict). Using a digital signature of the data including the public key 113 binds the browser integrity token to the public key 113 and therefore to the client device 110 and the web browser 111.

The digital signature of the browser integrity token can be generated by a private key owned and securely stored by the browser integrity system 170. The digital signature is publicly verifiable by a public key corresponding to the private key owned and securely stored by the browser integrity system 170. The use of the private and public keys of the browser integrity system to digitally sign the browser integrity tokens and verify these digital signatures in combination with the private and public keys of the web browser 111 to digitally sign the attestation token 122 and verify the signatures of the attestation tokens 122 provide a secure communication and establish a chain of trust between the entities of FIG. 1.

For example the digital component distribution system 150, the digital component partner 152, and the digital component providers 160 trust the browser integrity system 170. The digital component distribution system 150, the digital component partner 152, and the digital component providers 160 trust the browser integrity system 170 can verify that the browser integrity token is indeed generated by the browser integrity system 170 and not modified during transmission by verifying the digital signature using a public key that corresponds to the private key used to generate the digital signature and that is securely stored by the browser integrity system 170. Assuming that the browser integrity token indicates that the user is trustworthy, the digital component distribution system 150, digital component partner 152, and digital component providers 160 can use the browser public key 113 included in the browser integrity token and attestation token 122 (which are the same) to verify that the attestation token 122 is indeed generated by the web browser 111 that owns the browser public key 113/private key 112 pair and not modified during transmission.

In some implementations, the web browser 111 and the browser integrity system 170 interact to create multiple browser integrity tokens in a batch process. For example, the web browser 111 can send multiple public keys to the browser integrity system 170. The web browser 111 can also collect the fraud detection signals and provide these signals to the browser integrity system 170. The browser integrity system 170 can analyze the fraud detection signals and determine a verdict based on the fraud detection signals. The browser integrity system 170 can then generate a browser integrity token for each public key received from the web browser 111. This batch process can reduce the latency and processing time/resources required to generate the browser integrity tokens relative to generating the browser integrity tokens one at a time as needed by the web browser 111. The web browser 111 can store the browser integrity tokens at the client device 110 and consume one browser integrity token for each public key 113 based on the lifecycle of the public keys 113 (e.g., per request, per page view, per publisher domain, etc.).

In some implementations, the attestation token 122 also includes encrypted cookie elements 125. Each encrypted cookie element 125 can include an encrypted cookie for an entity for which a cookie 115 has been stored on the client device 110. For example, if the client device 110 includes a cookie 115 of the digital component distribution system 150 and the request 120 is for a digital component 129, the attestation token 122 can include an encrypted cookie element 125 for the digital component distribution system 150. In another example, if the client device 110 includes cookies 115 of multiple digital component providers 160, the attestation token 122 can include an encrypted cookie element 125 for each of the multiple digital component providers 160. The encrypted cookie elements 125 can be in the form of a string of characters that is parsed by the recipients of the request 120, as described in more detail below.

Entities that store a cookie 115 on the client device 110 can provide a public key 114 of the entity to the client device 110. The web browser 111 can use the public key 114 of an entity to encrypt the cookie value of the entity's cookie 115 stored on the client device 110. As described in more detail below, each entity that receives the attestation token 122 can decrypt their encrypted cookie element 115 to validate the integrity of the request and to obtain the cookie value. For example, a publisher 130 can use its cookie value to customize content of the resource 145 presented by the web browser 111. A digital component provider 160 can use its cookie value to select a digital component to provide to the client device 110.

By encrypting the cookies 115 in this way, an attestation token 122 (and request 120) can securely carry cookies 115 for multiple different entities. This prevents intermediaries and hackers from accessing the cookies of other entities.

In addition, to prevent intermediaries from mixing and matching portions of the set of data 123 and the signatures 124 from different requests, the encrypted cookie elements 125 can be bound to the set of data 123 and the digital signature 124. For example, each encrypted cookie element 125 can include a first portion that includes the entity's cookie and a second portion that includes a cryptohash of the digital signature 124. That is, the encrypted cookie element 125 for an entity can include an encrypted version of a combination of the entity's cookie 115 and the digital signature 124. The combination can be encrypted using the entity's public key 114.

When the entity receives an attestation token 122, the entity can attempt to find its cookie in the encrypted cookie elements 125. For example, the entity can decrypt the cookie elements 125, e.g., one at a time or in parallel, using its private key that corresponds to the public key 114 that would be used to encrypt its cookie 115. The entity can then determine whether the decrypted cookie element includes a cookie identifier of a cookie that the entity stored on a user device (e.g., the entity can store cookies on multiple client devices, with each one having a unique cookie identifier). The entity can also determine whether a portion of the decrypted cookie element matches the digital signature 124. If both matches are found, the entity can determine that the decrypted cookie element is its cookie and the request is valid. If one of the portions do not match, the entity can determine that the encrypted cookie element 125 doesn't belong to the entity. If none of the encrypted cookie element 125 belong to the entity, the entity did not store a cookie on the client device 110 from which the request 120 was sent or the request 120 was falsified.

To make it easier for an entity to find its encrypted cookie element 125 in the attestation token 122, the web browser 111 could be configured to include, in the attestation token 122, a list of the domains for which an encrypted cookie element 125 is included in the attestation token 122 or a list that maps the encrypted cookie elements 125 to their domains. However, entities, such as entities that have not stored a cookie 115 on the client device 110 or blacklisted entities, could use the list of domains as a fingerprint signal to track individual users. In addition, entities could use the list included in many requests 120 to determine the reach of each domain, which could be private data of the domains. Thus, including a list of domains can reduce privacy and security for users and domains.

Figure 2:
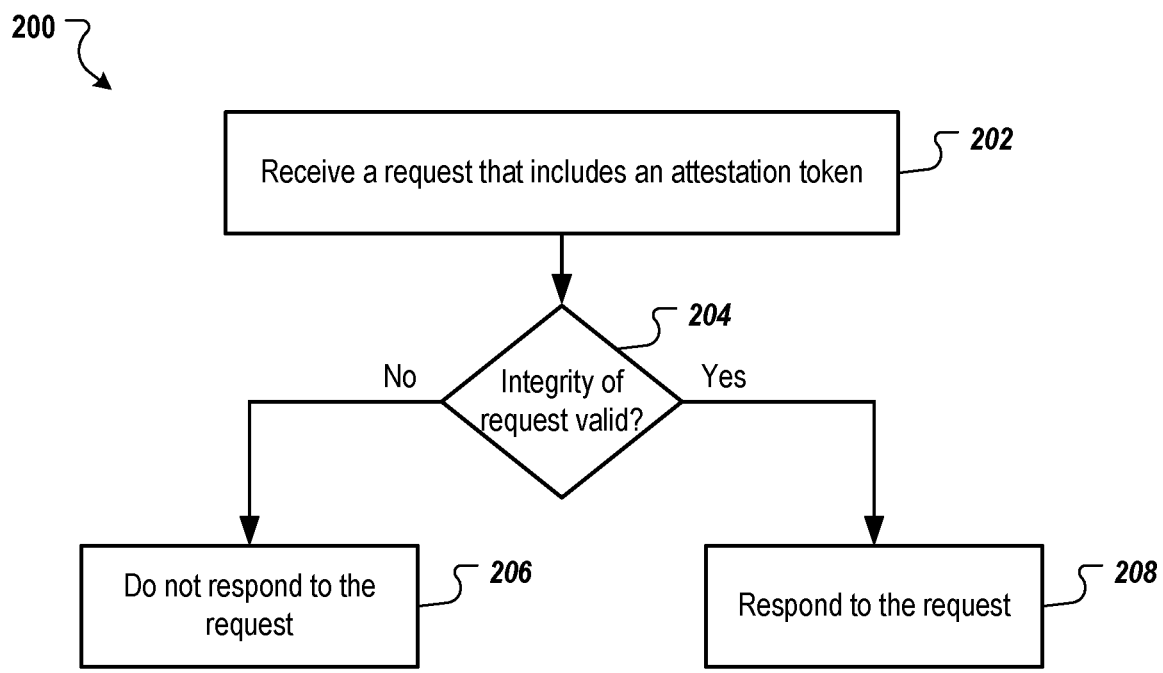
FIG. 2 is a flow diagram that illustrates an example process for validating the integrity of a request and responding to the request.

FIG. 2 is a flow diagram that illustrates an example process 200 for validating the integrity of a request and responding to the request. The process 200 can be implemented, for example, by a recipient of the request, such as a publisher 130, a digital component distribution system 150, a digital component partner 152, or a digital component provider 160 of FIG. 1. Operations of the process 200 can also be implemented as instructions stored on non-transitory computer readable media, and execution of the instructions by one or more data processing apparatus can cause the one or more data processing apparatus to perform the operations of the process 200.

A request that includes an attestation token is received (202). A web browser of a client device can send a request in response to a user interaction with the web browser. For example, if the user navigates to a website to view a resource, the web browser can send a request to the website. In another example, if the resource includes a digital component slot, the web browser can send, to a digital component distribution system, a request for a digital component. In yet another example, if the user changes settings for storing the user's data, e.g., the storage of the user's data that has been captured in cookies and sent to another entity, the request can be a request to modify (e.g., delete) the user's data.

As described above, the request can include an attestation token that includes a set of data, a digital signature of the set of data, and optionally encrypted cookie elements for one or more recipients. The set of data can include a public key of the web browser that sent the request, a token creation time that indicates the time at which the attestation token was created by the web browser, a payload, and/or a browser integrity token. The web browser can generate the digital signature of the set of data using the browser's public key. The web browser or another trusted program, e.g., the operating system of the client device, can generate the attestation token.

The web browser can generate an encrypted cookie element for one or more recipients of the request. For a given recipient, the web browser can generate the encrypted cookie element by encrypting the recipient's cookie stored on the client device using a public key of the recipient. In another example, the web browser can generate the encrypted cookie element for the given recipient by encrypting the recipient's cookie and the digital signature of the attestation token to bind the encrypted cookie element to the request.

A determination is made whether the integrity of the request is valid (204). The integrity of the request can be invalid if any data in the set of data changed between the time at which the attestation token was created, a duration of time between the token creation time and the time at which the request was received exceeds a threshold, the browser integrity token is invalid, or the attestation token does not include an encrypted cookie of the recipient. An example process for determining whether the integrity of a request is valid is illustrated in FIG. 3 and described below.

If a determination is made that the integrity of the request is invalid, a response to the request is not provided (206). That is, the recipient may ignore the request. For example, if the request is for a resource, the website may not provide the resource. If the request is for a digital component, the recipient that determines that the request is invalid may not provide a digital component. For example, a digital component provider may determine that the request is not valid because the provider's cookie is not included in an encrypted cookie element in the attestation token. However, another digital component provider may determine that the request is valid because the provider's cookie is included in an encrypted cookie element of the attestation token. If the request is to delete or change user data, the recipient may not delete or change the user data in response to the request if the integrity of the request is invalid.

If a determination is made that the integrity of the request is valid, a response is provided to the request (208). For example, if the request is for a resource, the website may provide the resource in response to the request. If the request is for a digital component, the recipient that determines that the request is valid may provide a digital component in response to the request. If the request is to delete or change user data, the recipient may delete or change the user data in response to the request if the integrity of the request is valid.

Figure 3:
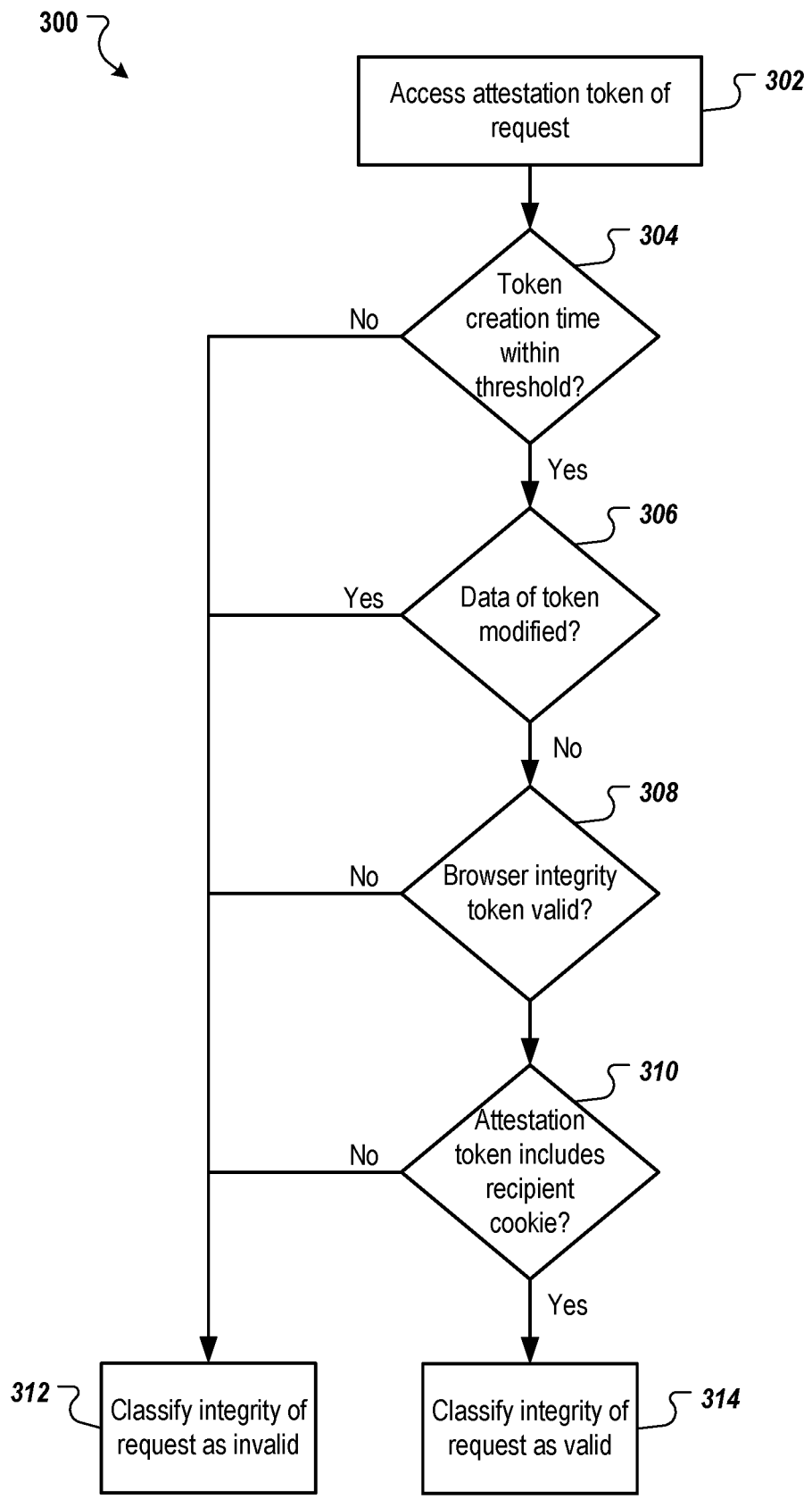
FIG. 3 is a flow diagram that illustrates an example process for determining whether the integrity of a request is valid using an attestation token.

FIG. 3 is a flow diagram that illustrates an example process 300 for determining whether the integrity of a request is valid using an attestation token. The process 300 can be implemented, for example, by a recipient of the request, such as a publisher 130, a digital component distribution system 150, a digital component partner 152, or a digital component provider 160 of FIG. 1. Operations of the process 300 can also be implemented as instructions stored on non-transitory computer readable media, and execution of the instructions by one or more data processing apparatus can cause the one or more data processing apparatus to perform the operations of the process 300.

An attestation token is accessed (302). The attestation token can be included with a request received from a web browser. As described above, the attestation token includes a set of data, a digital signature of the set of data, and optionally encrypted cookie elements for one or more recipients. The set of data can include a public key of the web browser that sent the request, a token creation time that indicates the time at which the attestation token was created by the web browser, a payload, and/or a browser integrity token.

A determination is made whether the token creation time is within a threshold time duration of a time at which the request was received or within a threshold time duration of a current time (304). For example, a determination can be made of the difference between the time at which the request was received (or the current time) and the token creation time. If the difference is less than or equal to the threshold time duration, the token creation time is within the threshold time duration. If the token creation time is not within the threshold time duration, e.g., meaning that the request is old, the integrity of the request can be classified at invalid (312).

If the token creation time is within the threshold time duration, e.g., meaning that the request is new or recent, a determination is made whether data in the set of data of the attestation token has been modified after the digital signature of the attestation token was generated (306). For example, the public key of the browser that is included in the attestation token can be used to verify the digital signature of the attestation token. If the signature is cannot be verified using the public key, a determination is made than the data in the set of data has been modified. For example, such data may have been modified by an entity that intercepted the request or an intermediary. If the digital signature is verified using the public key, a determination is made that the data in the set of data of the attestation token has not been modified.

If a determination is made that the data in the set of data has been modified, the integrity of the request is classified as being invalid (312). If a determination is made that the data in the set of data of the attestation token has not been modified, a determination is made whether the browser integrity token is valid (308). This determination can include determining whether the verdict of the browser integrity token is valid and determining whether the public key of the browser integrity token matches the public key of the attestation token. If the verdict is invalid or the public keys do not match, a determination is made that the browser integrity token is invalid and the integrity of the request is classified as invalid. If the verdict is valid and the public keys match, a determination can be made that the browser integrity token in valid.

This determination can also include verifying the digital signature of the browser integrity token. As described above, the browser integrity system can digitally sign the data of the browser integrity token using a private key of the browser integrity system. The browser integrity system can provide a public key that corresponds to this private key to recipients that may receive device integrity tokens generated by the browser integrity system. Each recipient of the request can use this public key to verify the signature of the browser integrity token which, if successful, indicates that the data of the browser integrity token has not been modified since it was created. In this example, if the verdict is valid, the public keys match, and the digital signature of the browser integrity token is verified successfully, a determination can be made that the browser integrity token in valid.

If a determination is made that the browser integrity toke is valid, a determination is made whether the attestation token includes the recipient's cookie (310). As described above, the attestation token can include, for each of one or more of the recipients of the request, an encrypted cookie element. The encrypted cookie element can include an encrypted version of the recipient's cookie that has been encrypted using a public key of the recipient. Example processes for determining whether an attestation token includes a recipient's cookie are illustrated in FIGS. 4 and 5 and described below.

If the attestation token includes the recipient's cookie, the integrity of the request can be classified as valid (314). If not, the integrity of the request can be classified as invalid (312) or the recipient can determine that the recipient has not stored a cookie at the client device from which the request was sent.

In some implementations, the operation 310 can be excluded or skipped. In such an implementation, the request can be classified as valid if all of operations 304-308 are passed.

Figure 4:
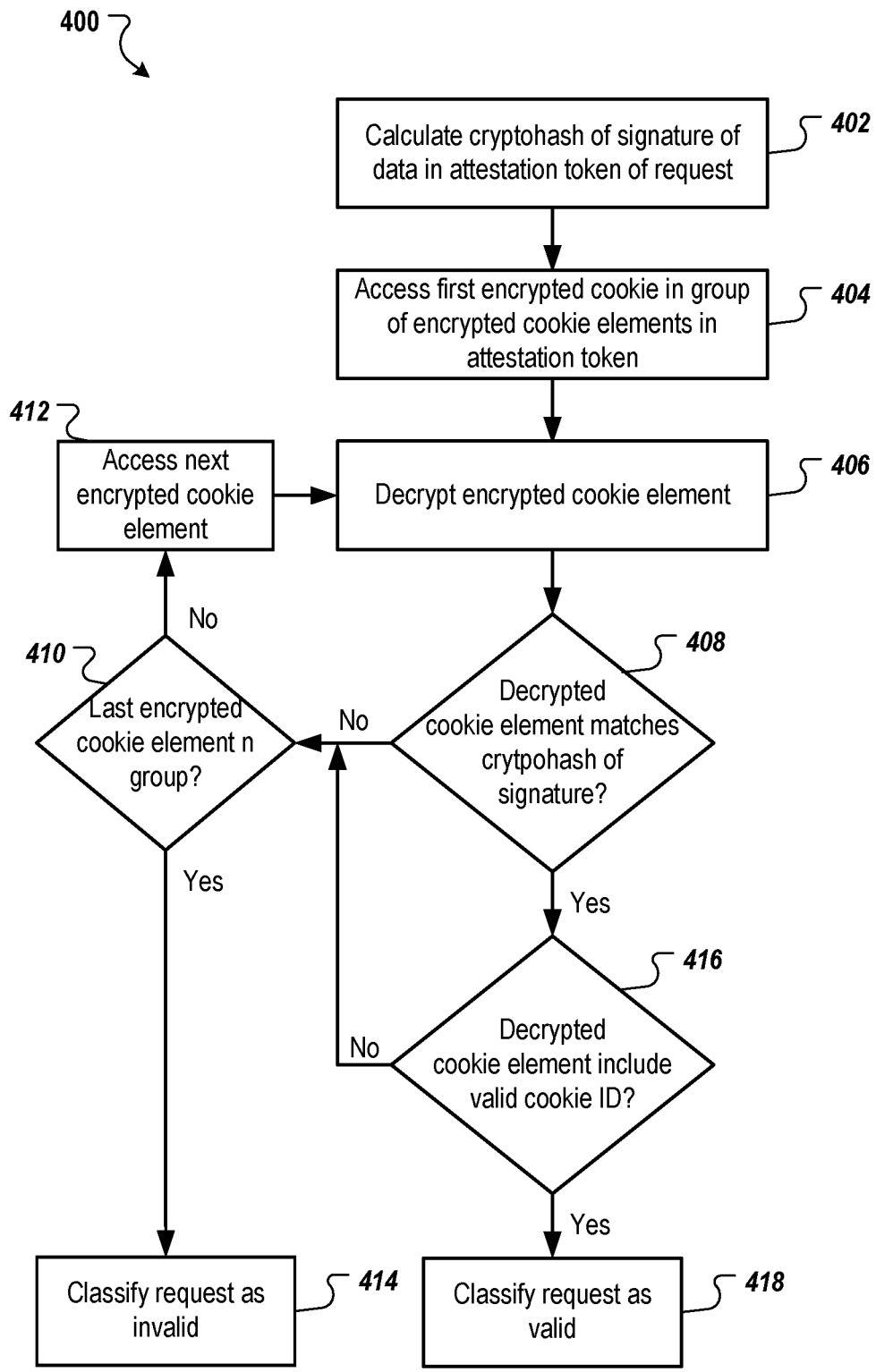
FIG. 4 is a flow diagram that illustrates another example process for determining whether the integrity of a request is valid using an attestation token.
Figure 5:
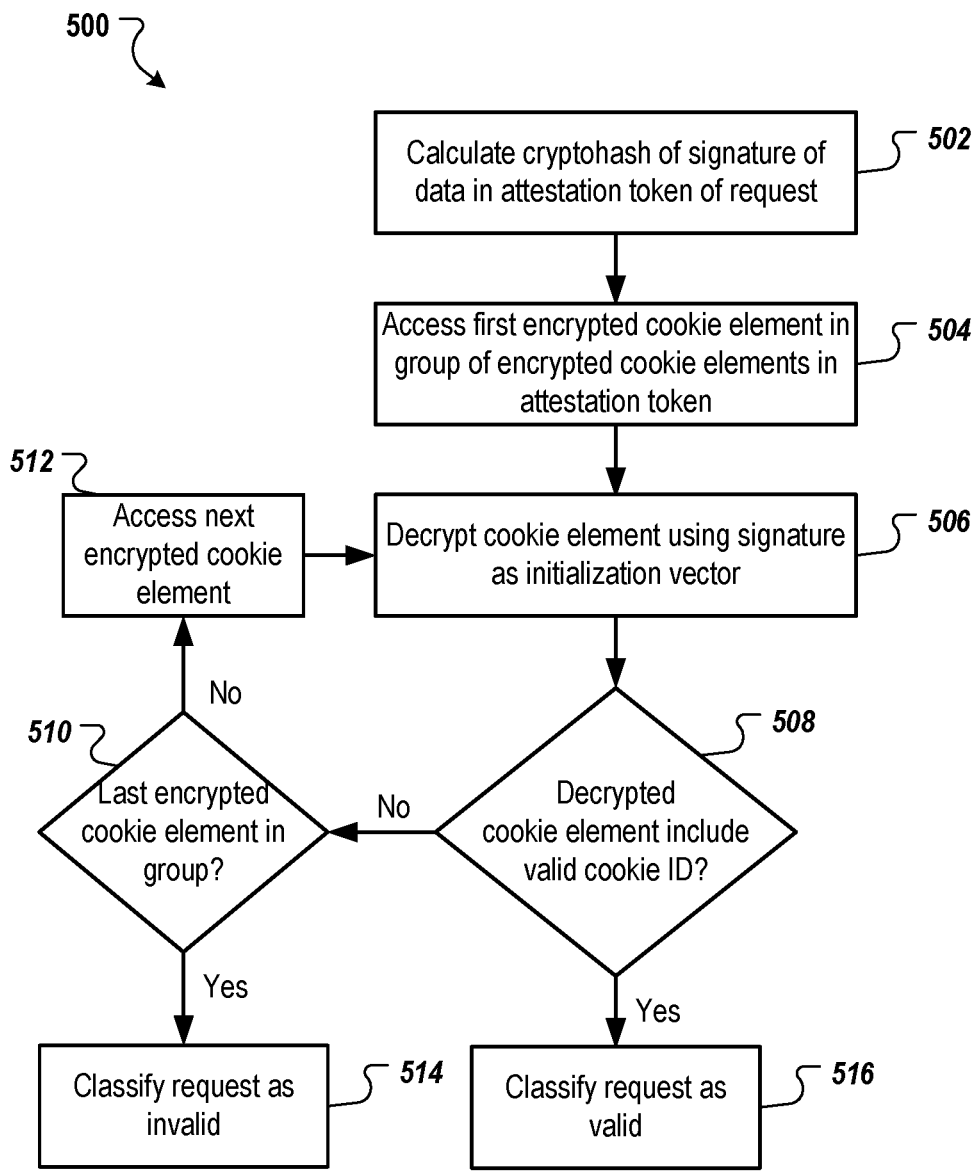
FIG. 5 is a flow diagram that illustrates another example process for determining whether the integrity of a request is valid using an attestation token.

FIGS. 4 and 5 illustrate processes for determining the integrity of requests that include encrypted cookie elements for entities. If the encrypted cookie element for a recipient only contains the recipient's cookie, the encryption result is stable. Intermediaries or others that may gain access to the requests can rely on the encrypted cookie element as a stable identifier to track a user. To prevent such tracking, randomness can be introduced to the encryption process such that the encryption element for a given recipient and a given client device is specific to each request. The processes 400 and 500 are two example ways of introducing such randomness.

FIG. 4 is a flow diagram that illustrates another example process 400 for determining whether the integrity of a request is valid using an attestation token. The process 400 can be implemented, for example, by a recipient of the request, such as a publisher 130, a digital component distribution system 150, a digital component partner 152, or a digital component provider 160 of FIG. 1. Operations of the process 400 can also be implemented as instructions stored on non-transitory computer readable media, and execution of the instructions by one or more data processing apparatus can cause the one or more data processing apparatus to perform the operations of the process 400.

In this example process 400, a request includes an attestation token that has a group of encrypted cookie elements, e.g., one for each of multiple recipients. The encrypted cookie element for each recipient is an encrypted version of a combination of the recipient's cookie that was stored at the client device and a cryptohash of the digital signature of the set of data included in the attestation token. That is, the web browser that sends the request can use a given recipient's public key to encrypt a combination of the recipient's cookie and the cryptohash of the digital signature. The cryptohash of the digital signature for each recipient can be calculated by applying a cryptohash algorithm, e.g., SHA256, over the digital signature. This cryptohash introduces the randomness that makes the encrypted cookie element specific to each request and also cryptographically binds the encrypted cookie element to the rest of the attestation token.

A cryptohash of a digital signature of a set of data in an attestation token of a request is calculated (402). The cryptohash of the digital signature can be calculated using a cryptohash algorithm adopted by the browser.

A first encrypted cookie element in the group of encrypted cookie elements is accessed (404). In this example, each encrypted cookie element is accessed one by one. In other implementations, multiple cookie elements can be accessed and processed in parallel, e.g., using multiple threads or multiple processors.

The encrypted cookie element is decrypted (406). The encrypted cookie element can be decrypted using the recipient's private key that corresponds to the recipient's public key used to encrypt its cookie.

A determination is made whether the decrypted cookie element include a portion that matches the cryptohash of the digital signature calculated in operation 402 (408). For example, the cryptohash of the digital signature can be compared to the decrypted cookie element to determine whether there is a match between the cryptohash and a portion of the decrypted cookie element.

If there is no match, a determination is made whether the currently accessed cookie element is the last encrypted cookie element included in the group (410). If the currently accessed cookie element is not the last encrypted cookie element in the group, the next encrypted cookie element is accessed (412). Operations 406 and 408 are then performed on this cookie element.

For each decrypted cookie element that includes a portion that matches the cryptohash of the digital signature, a determination is made whether the decrypted cookie element includes a portion that matches a cookie identifier of the recipient (416). For example, the recipient may be a publisher or digital component provider that has stored a cookie on multiple client devices. Each of the cookies can have a unique cookie identifier that is stored by the publisher or digital component provider. Thus, the recipient can compare its cookie identifiers to the decrypted cookie element to determine whether the decrypted cookie element includes a valid cookie identifier of the recipient. If not, the process 400 returns to operation 410 until a match is found at operation 416 or all encrypted cookie elements in the group are accessed and processed.

If a decrypted cookie element includes a portion that matches a valid cookie identifier of the recipient (and a portion that matches the cryptohash of the digital signature in operation 408), the request is classified as valid (418). If none of the decrypted cookie elements include both matching portions, the request is classified as invalid (414), or the recipient can determine that it has not stored a cookie on the client device from which the request was sent.

FIG. 5 is a flow diagram that illustrates another example process 500 for determining whether the integrity of a request is valid using an attestation token. The process 500 can be implemented, for example, by a recipient of the request, such as a publisher 130, a digital component distribution system 150, a digital component partner 152, or a digital component provider 160 of FIG. 1. Operations of the process 500 can also be implemented as instructions stored on non-transitory computer readable media, and execution of the instructions by one or more data processing apparatus can cause the one or more data processing apparatus to perform the operations of the process 500.

In this example process 500, a request includes an attestation token that has a group of encrypted cookie elements, e.g., one for each of multiple recipients. The encrypted cookie element for each recipient is an encrypted version of the recipient's cookie using the digital signature of the set of data included in the attestation token as an encryption initialization vector. The use of the encryption initialization vector introduces the randomness that makes the encrypted cookie element specific to each request and also cryptographically binds the encrypted cookie element to the rest of the attestation token.

A cryptohash of a digital signature of a set of data in an attestation token of a request is calculated (502). The cryptohash of the digital signature can be calculated using the same cryptohash algorithm adopted by the browser.

A first encrypted cookie element in the group of encrypted cookie elements is accessed (504). In this example, each encrypted cookie element is accessed one by one. In other implementations, multiple cookie elements can be accessed and processed in parallel, e.g., using multiple threads or multiple processors.

The encrypted cookie element is decrypted (506). The encrypted cookie element can be decrypted using the recipient's private key that corresponds to the recipient's public key used to encrypt its cookie and the digital signature included in the attestation token as the encryption initialization vector.

A determination is made whether the decrypted cookie element matches a cookie identifier of the recipient (508). For example, the recipient may be a publisher or digital component provider that has stored a cookie on multiple client devices. Each of the cookies can have a unique cookie identifier that is stored by the publisher or digital component provider. Thus, the recipient can compare its cookie identifiers to the decrypted cookie element to determine whether the decrypted cookie element includes a valid cookie identifier of the recipient. If not, a determination is made whether the currently accessed cookie element is the last encrypted cookie element included in the group (510). If the currently accessed cookie element is not the last encrypted cookie element in the group, the next encrypted cookie element is accessed (512). Operations 506 and 508 are then performed on this cookie element.

If a decrypted cookie element matches a valid cookie identifier of the recipient, the request is classified as valid (516). If none of the decrypted cookie elements match a valid cookie identifier of the recipient, the request is classified as invalid (514), or the recipient can determine that it has not stored a cookie on the client device from which the request was sent.

Figure 6:
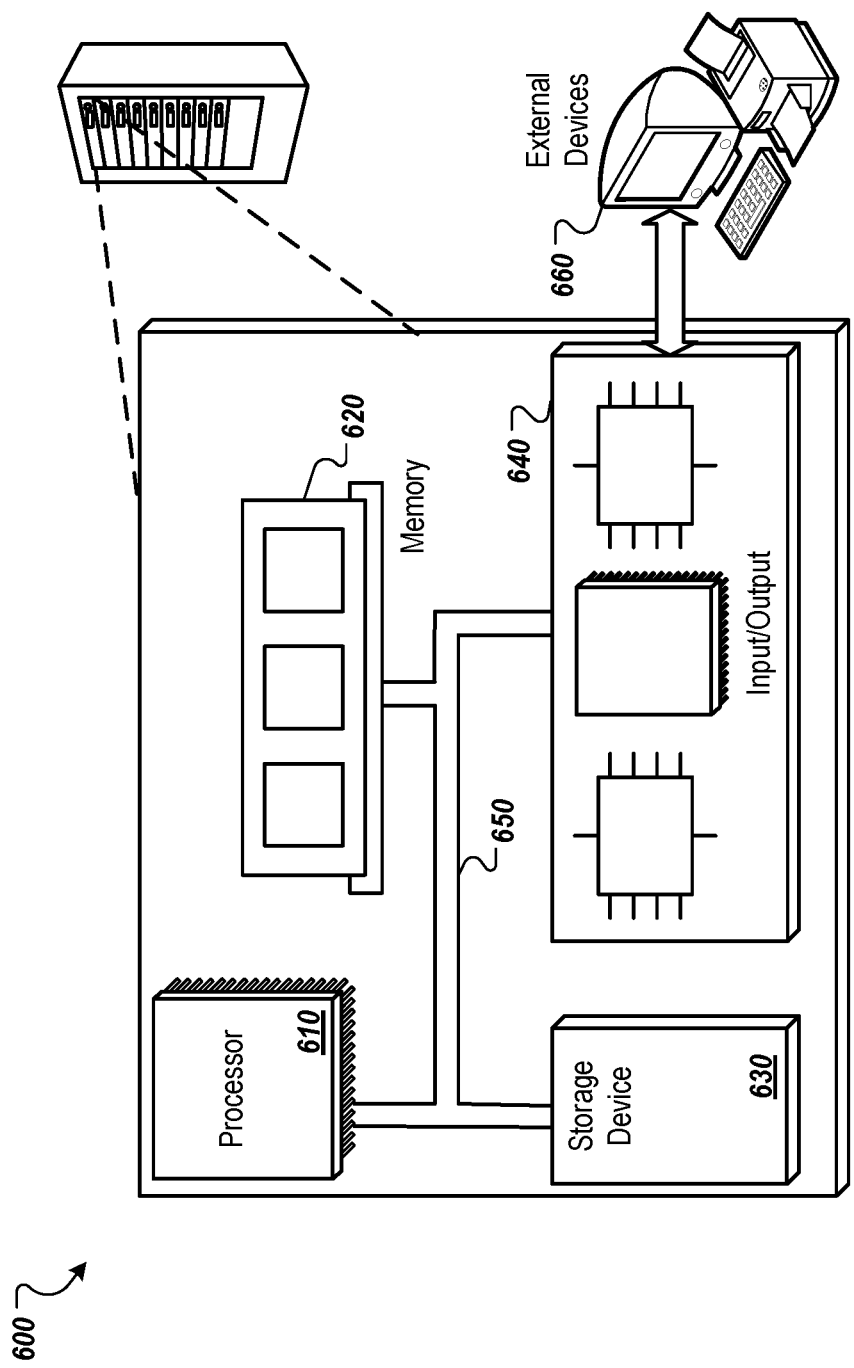
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implement method comprising:
receiving, from an application of a client device, a request including an attestation token of the application, the attestation token including:
a set of data that includes at least a public key of the application and a token creation time that indicates a time at which the attestation token was created;
a signature of the set of data, wherein the signature was generated using a private key that corresponds to the public key; and
a group of encrypted cookie elements that includes, for each of a plurality of recipients of the request, a respective encrypted cookie element that includes an encrypted result from encrypting a cookie of the recipient that is stored on the client device using a public key of the recipient, wherein the respective encrypted cookie element for each recipient is different from the respective encrypted cookie element for each other recipient; and
verifying an integrity of the request using the attestation token, including:
determining whether the token creation time is within a threshold duration of a time at which the request was received;
determining, using the public key and the signature of the set of data generated using the private key, whether the set of data was modified after the attestation token was created; and
determining that the integrity of the request is valid based at least on determination that the token creation time is within the threshold duration of the time at which the request was received and a determination that the set of data has not been modified since the attestation token was created; and
responding to the request in response to determining that the integrity of the request is valid.

2. The method of claim 1, wherein the application is a web browser.

3. The method of claim 2, wherein:
the set of data further comprises a browser integrity token that specifies whether integrity of the web browser is valid; and
determining that the integrity of the request is valid comprises determining that the browser integrity token specifies that the integrity of the web browser is valid.

4. The method of claim 1, wherein the request is for content for delivery to application, the method further comprising providing the content in response to determining that the request is valid.

5. The method of claim 1, wherein the set of data further comprises a payload that includes data specific to the request.

6. The method of claim 1, wherein the set of data further comprises a payload that includes data specific to the request, the request comprises a request to delete user data and the payload comprises data specifying an operation to delete the user data.

7. The method of claim 1, wherein the encrypted result of the respective encrypted cookie element for each recipient includes an encrypted result from encrypting a combination of the cookie of the recipient and the signature of the set of data.

8. The method of claim 7, wherein determining that the integrity of the request is valid comprises:
- decrypting, by a given recipient and using a private key of the given recipient, a given encrypted cookie element to generate a decrypted cookie element;
- determining that the decrypted cookie element comprises a first portion that matches the signature of the set of data; and
- determining that the decrypted cookie element comprises a second portion that matches a cookie identifier of the given recipient.

9. The method of claim 1, wherein the encrypted result of the respective encrypted cookie element for each recipient includes an encrypted result from encrypting the cookie of the recipient using the signature of the set of data as an encryption initialization vector.

10. The method of claim 9, wherein determining that the integrity of the request is valid comprises:
- decrypting, by a given recipient and using a private key of the given recipient and the signature of the set of data as the encryption initialization vector, a given encrypted cookie element to generate a decrypted cookie element; and
- determining that the decrypted cookie element matches a cookie identifier of the given recipient.

11. The method of claim 1, further comprising ignoring the request whenever a determination is made that the integrity of the request not valid.

12. A computer-implement method comprising:
- generating, at a web browser of a client device, an attestation token having:
  - a set of data that includes at least (i) a public key of the web browser and (ii) a token creation time that indicates a time at which the attestation token was created;
  - a signature of the set of data, wherein the signature is generated using a private key that corresponds to the public key; and
  - a group of encrypted cookie elements that includes, for each of a plurality of recipients, a respective encrypted cookie element that includes an encrypted result from encrypting a cookie of the recipient that is stored on the client device using a public key of the recipient, wherein the respective encrypted cookie element for each recipient is different from the respective encrypted cookie element for each other recipient and
- transmitting a request to one or more of the plurality of recipients, the request including the attestation token.

13. The method of claim 12, wherein:
the set of data further comprises a browser integrity token that specifies whether integrity of the web browser is valid.

14. The method of claim 12, wherein the set of data further comprises a payload that includes data specific to the request.

15. The method of claim 12, wherein the set of data further comprises a payload that includes data specific to the request, the request comprises a request to delete user data and the payload comprises data specifying an operation to delete the user data.

16. The method of claim 12, wherein the encrypted result of the respective encrypted cookie element for each recipient includes an encrypted result from encrypting a combination of the cookie of the recipient and the signature of the set of data.

17. The method of claim 12, wherein the encrypted result of the respective encrypted cookie element for each recipient includes an encrypted result from encrypting the cookie of the recipient using the signature of the set of data as an encryption initialization vector.

18. A system, comprising:
- one or more processors; and
- one or more memories having stored thereon computer readable instructions configured to cause the one or more processors to perform operations comprising:
  - receiving, from an application of a client device, a request including an attestation token of the application, the attestation token including:
    - a set of data that includes at least a public key of the application and a token creation time that indicates a time at which the attestation token was created;
    - a signature of the set of data, wherein the signature was generated using a private key that corresponds to the public key; and
    - a group of encrypted cookie elements that includes, for each of a plurality of recipients of the request, a respective encrypted cookie element that includes an encrypted result from encrypting a cookie of the recipient that is stored on the client device using a public key of the recipient, wherein the respective encrypted cookie element for each recipient is different from the respective encrypted cookie element for each other recipient and
  - verifying an integrity of the request using the attestation token, including:
    - determining whether the token creation time is within a threshold duration of a time at which the request was received;
    - determining, using the public key and the signature of the set of data generated using the private key, whether the set of data was modified after the attestation token was created; and
    - determining that the integrity of the request is valid based at least on determination that the token creation time is within the threshold duration of the time at which the request was received and a determination that the set of data has not been modified since the attestation token was created; and
  - responding to the request in response to determining that the integrity of the request is valid.

19. The system of claim 18, wherein the encrypted result of the respective encrypted cookie element for each recipient includes an encrypted result from encrypting a combination of the cookie of the recipient and the signature of the set of data.

20. The system of claim 18, wherein determining that the integrity of the request is valid comprises:
- decrypting, by a given recipient and using a private key of the given recipient, a given encrypted cookie element to generate a decrypted cookie element;
- determining that the decrypted cookie element comprises a first portion that matches the signature of the set of data; and
- determining that the decrypted cookie element comprises a second portion that matches a cookie identifier of the given recipient.

21. The system of claim 18, wherein the encrypted result of the respective encrypted cookie element for each recipient includes an encrypted result from encrypting the cookie of the recipient using the signature of the set of data as an encryption initialization vector.

22. The system of claim 18, wherein determining that the integrity of the request is valid comprises:
- decrypting, by a given recipient and using a private key of the given recipient and the signature of the set of data as the encryption initialization vector, a given encrypted cookie element to generate a decrypted cookie element; and
- determining that the decrypted cookie element matches a cookie identifier of the given recipient.

* * * * *